United States Patent [19]
Hanaway et al.

[11] Patent Number: 5,842,039
[45] Date of Patent: Nov. 24, 1998

[54] MOST RECENT FIRST DYNAMIC PROTOCOL DETECTION FOR USE WITH A PROGRAMMABLE CONTROLLER

[75] Inventors: Kelly P. Hanaway, Sussex; David J. Lillie, Pewaukee; Paul G. Kucharski, Waukesha, all of Wis.

[73] Assignee: Allen Bradley Company, LLC, Milwaukee, Wis.

[21] Appl. No.: 654,468

[22] Filed: May 28, 1996

[51] Int. Cl.$^6$ ............................... G06F 9/00; G06F 11/00
[52] U.S. Cl. ............................................................. 395/831
[58] Field of Search ................................... 364/138, 180, 364/181; 395/831, 834, 200.51, 200.6; 375/222, 368, 369; 360/825.08, 825.1

[56] References Cited

U.S. PATENT DOCUMENTS

| | | | |
|---|---|---|---|
| 3,569,943 | 3/1971 | Mackie | 705/22 |
| 4,215,243 | 7/1980 | Maxwell | 379/93.34 |
| 4,635,275 | 1/1987 | Borg et al. | 375/222 |
| 5,274,679 | 12/1993 | Abe et al. | 375/370 |
| 5,553,271 | 9/1996 | Hile et al. | 395/500 |
| 5,557,634 | 9/1996 | Balasubramanian et al. | 375/222 |

*Primary Examiner*—Dinh C. Dung
*Attorney, Agent, or Firm*—Michael A. Jaskolski; John M. Miller; John J. Horn

[57] ABSTRACT

A method to be used with a programmable controller that can communicate with peripheral devices in two protocols, the method for automatically switching controller communication between the two protocols when the protocol used by a peripheral device is different than the protocol currently being used by the controller.

14 Claims, 4 Drawing Sheets

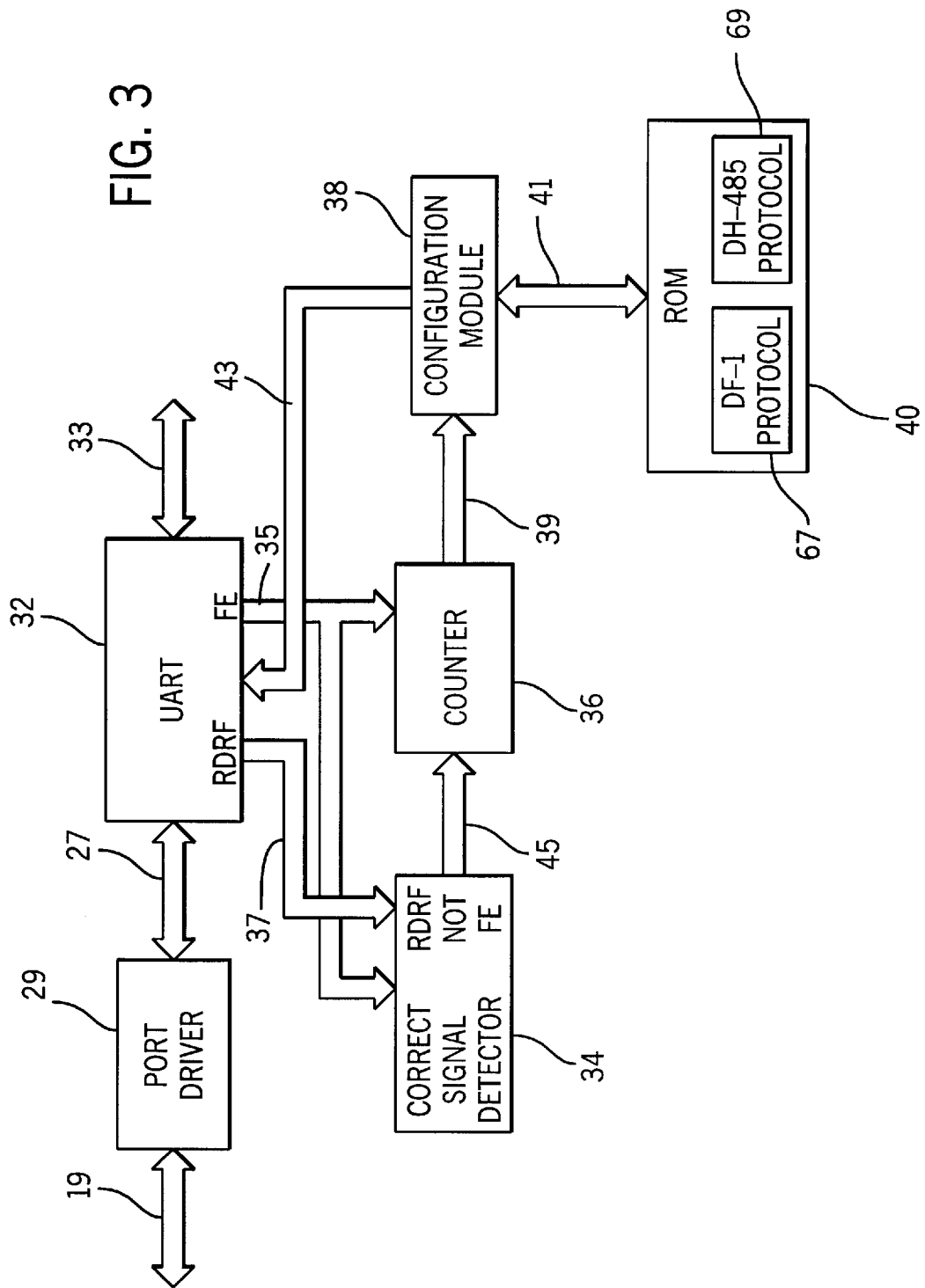

MOST RECENT FIRST DYNAMIC PROTOCOL DETECTION FOR USE WITH A PROGRAMMABLE CONTROLLER

FIELD OF THE INVENTION

The present invention relates to programmable controllers which are employed to control the operation of one or more pieces of manufacturing equipment and, more particularly, the invention relates to a method used to automatically change controller communication protocol at an interface port to match the protocol used by a peripheral device.

BACKGROUND OF THE INVENTION

Programmable controllers, such as the one as described in U.S. Pat. No. 4,858,101, typically are connected to industrial equipment such as assembly lines and machine tools to sequentially operate the equipment in accordance with the a stored control program. The control program comprises instructions which are read out in rapid sequence and executed to examine the condition of selected sensing devices on the controlled equipment, or to energize or deenergize selected operating devices on the controlled equipment contingent upon the status of one or more of the examined sensing devices.

Periodically, there is a need to examine the control program or to alter program instructions to change equipment operation. In addition, it is often advantageous if control data can be monitored or sampled so that an operator can analyze controller and equipment operation. To meet program altering, monitoring and sampling requirements, programmable controllers are equipped with an interface port at which programming, monitoring and sampling apparatus can be connected for two way communication according to one of several different communication protocols.

One of the first apparatus developed for connection to the interface port is refereed to as a hand-held programming device (HHP). HHPs were designed as an inexpensive way to display and change any program section, one small section at time, and to monitor and sample small segments of data at single controller nodes. To minimize costs, HHP's have typically been configured to include only hardware and software needed to provide required functionality. To this end, an HHP typically includes a simple keyboard for entering information, a one or two line display for viewing entered information and small segments of monitored data, a cable for connection to the interface port and a simple processor communicating with each of the keyboard, display and cable.

HHPs were designed to communicate in a first communication protocol referred to as the DF1 protocol which is a full duplex point-to-point protocol. The DF1 protocol is optimal for devices existing in topologies not requiring networking (i.e. multiple nodes). HHPs and the DF1 protocol have sufficient capabilities to support industrial controllers that performed simple programs to facilitate relatively simple industrial processes.

More complex processes and associated programs however, require more complex programming and monitoring apparatus and a more complex protocol to provide more functionality. To fill the monitoring and computing needs of complex programs the industry now uses personal computers that allow a user to observe and edit large sections of control programs. In addition, in conjunction with a more functional DH-485 protocol, personal computers can be used to electronically jump from one controller node to another for monitoring and sampling purposes.

Despite the advantages of personal computers over HHPs, HHPs have continued to be popular for a number of reasons. First, the cost of an HHP is a fraction of the cost of a personal computer. Second, HHIs are relatively small, typically fitting in a users hand and therefore, are relatively easy to transport between controllers. Third, HHPs are already extensively or exclusively used by many different companies that do not require DH-485 functionality. Fourth, there are still some instances wherein DF1 capabilities are more advantageous than DH-485 capabilities. In these instances, it is easier to use an HHP than to use a personal computer to provide the required functionality.

Because HHPs that only communicate in the DF1 protocol and personal computers that can communicate in DH-485 are being used, there is a dual-protocol problem (i.e. both the DF1 and the DH-485 protocol should be supported). To this end, most controllers are equipped to either communicate in the DF1 or the DH-485 protocols, depending on controller configuration. Thus, where DH-485 capabilities are required, a user instructs the controller to communicate at the interface port in the DH-485 protocol. However, where an HHP is used and communication must be in the DF1 protocol to support the HHP, a user instructs the controller to communicate at the port in the DF1 protocol. In addition, because some controllers can only communicate in the DF1 protocol and there are instances where it is advantageous to use the DF1 protocol instead of the DH-485 protocol, the industry has provided dual-protocol computers that can communicate in both the DF1 and DH-485 protocols.

While dual-protocol controllers and computers provide a workable solution to the dual protocol problem, the steps required to switch between the two protocols have proven burdensome and are recognized as one of the primary limitations to the present solution. Presently, when a controller is configured to communicate at the interface port in a first protocol, the controller will only communicate in the first protocol until a user manually requests that the controller be reconfigured. Unfortunately, controller reconfiguration requests must be made through the interface port and must be made in the controllers currently configured communication protocol. Because of these limitations, it is often necessary to reconfigure a computer prior to, and after, reconfiguring the controller to affect a protocol switch.

For example, assuming a dual-protocol controller was last used to communicate in the DF1 protocol and a user wishes to communicate via a dual protocol computer in the DH-485 protocol, if the computer is initially configured to communicate in the DH-485 protocol, the user would have to first reconfigure the computer to communicate in the DF1 protocol for communication with the controller. Computer reconfiguration is extremely inconvenient, typically requiring the user to step through a series of configuration options to change computer protocols.

With the computer configured to communicate in the DF1 protocol and connected to the interface port, the user can instruct the controller via the DF1 protocol to switch from the DF1 to the DH-485 protocol. Once the controller has switched to the DH-485 protocol, the computer, which is still configured for DF1 communication, can no longer communicate with the controller. To reestablish communication with the controller, the user must again reconfigure the computer for communication in the DH-485 protocol. This second reconfiguration, like the first, is inconvenient.

In addition to the inconvenience of having to configure the computer often to switch protocols, HHPs are virtually useless with any controller that is currently configured to communicate in the DH-485 protocol. Because HHPs can only communicate in the DF1 protocol, where a dual-protocol controller was last used in the DH-485 protocol, the HHP cannot be used unless a computer is used to first switch the controller protocol to DF1. In this case, the HHP would be redundant (i.e. the computer required to switch to the DF1 protocol could be used instead of the HHP to communicate in DF1). Thus, HHPs are not always useable with dual-protocol controllers.

Therefore, it would be advantageous to have a method and/or apparatus that could automatically determine when the communication protocol used by a peripheral device connected to the controller at an interface port is different than the protocol currently being used at the port and, when the protocol is different, could automatically change protocols and begin communicating at the interface port in the protocol used by the peripheral device. This would eliminate the laborious computer reconfiguration steps that are presently required to change communication protocols.

SUMMARY OF THE INVENTION

In accordance with the inventive method, instead of requiring a user to step through several computer reconfigurations to change controller interface port protocol, port protocol is automatically changed when the protocol used by a peripheral device attached thereto changes. Thus, the inventive method advantageously simplifies the procedure required to switch between two different supported protocols.

The inventive method is used with a dual-protocol programmable controller that receives messages from programming and monitoring apparatus and provides data thereto via an interface port. When messages are received, the controller determines if the messages are in the controller's currently configured protocol. When the messages are not in the currently configured protocol, the controller automatically reconfigures itself in its other supported protocol for communication in the other protocol.

One object of the invention is to reduce the manual steps required to switch from one controller supported protocol to another. By automatically determining when a programming and monitoring apparatus is not communicating in the controller's currently configured protocol and switching to the other controller supported protocol, the inventive method eliminates at least one, and in some instances two, computer reconfiguration procedures.

Another object is to render HHPs useable with virtually all controllers that are capable of communicating in the DF1 protocol. With the inventive method, when and HHP is plugged into an interface port and begins to send messages to the controller, if the controller is configured to communicate in the DH-485 protocol, the controller will determine that the HHP is not communicating in the DH-485 protocol and will automatically reconfigure to communicate in the DF1 protocol.

The DF1 and the DH-485 protocols have different bit patterns, each protocol including start and stop bits that "frame" data bits in different arrangements. Thus, the DF1 and DH-485 protocols can be identified by their unique frames or, in the alternative, by framing errors. In other words, when data is expected in the DF1 protocol and a framing error occurs, it is presumed that received messages are in the DH-485 protocol.

Information is typically transferred between a programming and monitoring device and a controller along a single cable so that data words have to be transferred in series bits. However, controllers typically manipulate data in parallel words. To reformat serial data into parallel data and vice versa, the interface port usually feeds a UART (Universal Asynchronous Receiver/Transceiver). The UART in the dual programmable controller has a framing error bit that indicates when data received is not in the UART's current configuration, which is established by the active protocol.

Yet another object is to implement the inventive method inexpensively. By using the framing error signal provided by the UART to determine when a peripheral device is operating in a protocol other than the controller's currently configured protocol, the inventive method can be implemented using existing controller hardware.

Other and further aspects and objects of the present invention will become apparent during the course of the following description and by reference to the accompanying drawings.

BRIEF DESCRIPTION OF THE DRAWINGS

FIG. 3 is a block diagram of a portion of a controller according to the present invention.

DESCRIPTION OF THE PREFERRED EMBODIMENTS

Figure 1:
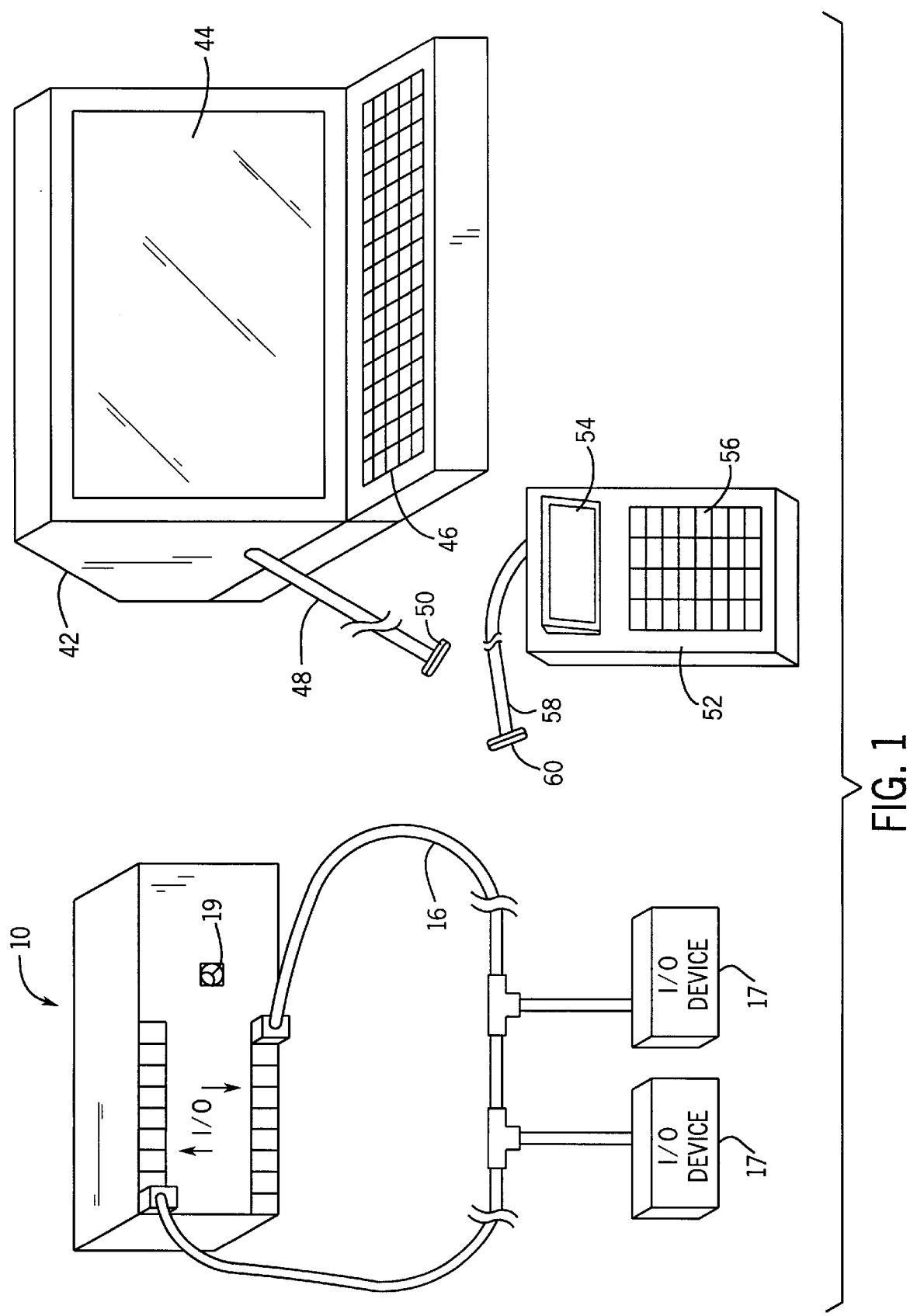
FIG. 1 is pictorial representation of a programmable controller.

FIG. 1 illustrates a conventional programmable controller 10, such as an Allen-Bradley 1771 series system, which executes program instructions to operate a machine. The controller 10 stores and executes a user-defined control program to control operation of the machine. Located on-board the controller 10 are a number of input/output (I/O) points 13 which interface the controller 10 to sensing an operating device on the controlled machine. In addition, the controller 10 includes an interface port 19.

As illustrated in FIG. 1, different types of I/O devices 17, such as a radio frequency tag transceiver, are coupled to the on-board I/O points 13 to exchange data with the programmable controller 10. A programming and monitoring device can be connected to configure the controller 10 to perform different tasks or to monitor controller 10 data via the interface port 19.

Referring still to FIG. 1, two different types of programming and monitoring apparatus are illustrated. The first type is a personal computer 42 or the like that includes a screen 44 for viewing control program segments and entered data, a keyboard 46 for entering and retrieving data and an internal microprocessor (not shown). The computer 42 also includes a cable 48 with a connector 50 designed to be receivable by the interface port 19. The second programming and monitoring apparatus is an HHP 52 which includes a reduced sized screen 54 and a reduced keyboard 56 and a microprocessor (not shown). The HHP 52, like the computer 42 also includes a cable 58 and a connector 60 designed to connect with the interface port 19.

Figure 2A:
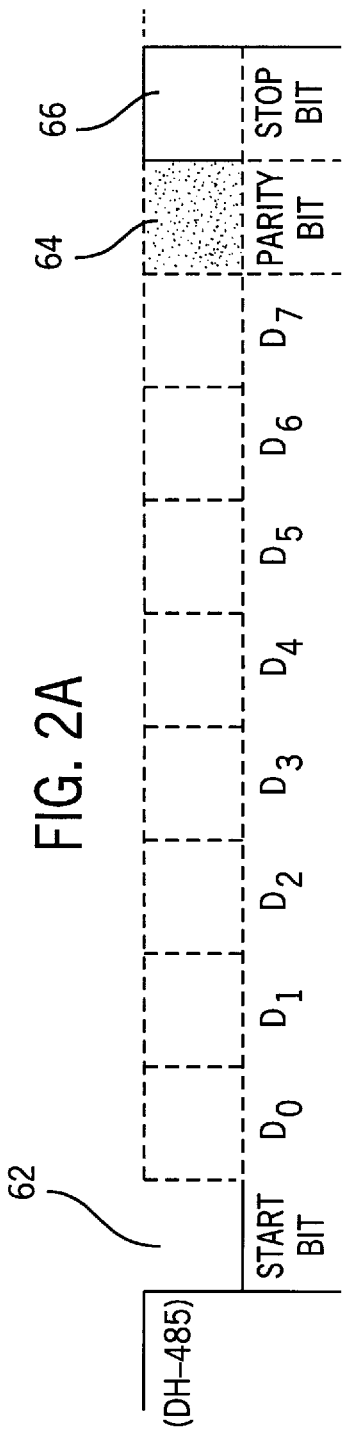
FIG. 2A is an exemplary timing diagram according to a first communication protocol.
Figure 2B:
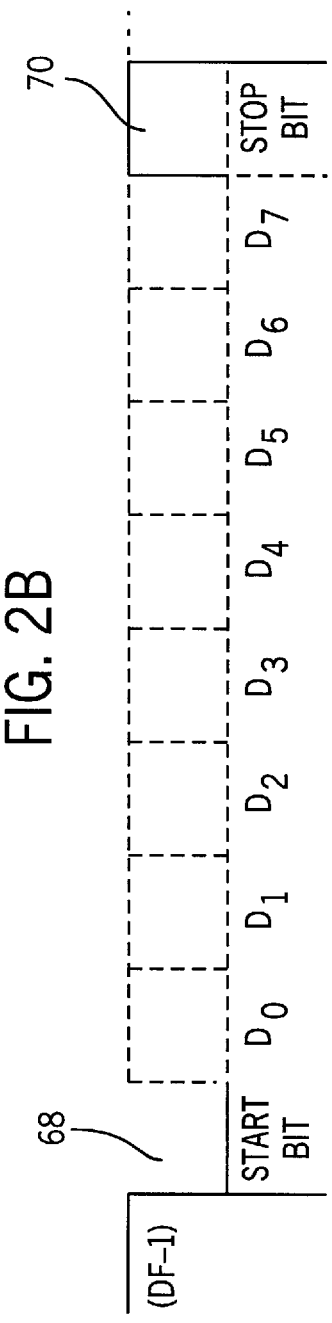
FIG. 2B is an exemplary timing diagram similar to the one in FIG. 2A except that it is for a second communication protocol.

Referring to FIGS. 2A and 2B, two communication protocols, one identified as the DF1 protocol and the other identified as the DH-485 protocol are illustrated. In order to simplify this explanation, the protocols illustrated in FIGS. 2A and 2B, and referred to hereinafter have been simplified and are not the actual DF1 and DH-485 protocols. For the purposes of this explanation, the simplified protocols in FIGS. 2A and 2B reflect the actual DF1 and DH-485 protocols in that the simplified protocols are differently formatted or framed.

Referring still to FIG. 2A, the DH-485 communication protocol is characterized by a low start bit 62, eight data bits $D_0$–$D_7$, an even parity bit 64, and one stop bit 66. The data bits $D_0$–$D_7$, and the parity bit 64 are said to be "framed" between the start bit 62 and the one stop bit 66. When operating under the DH-485 protocol, when the framing start and stop bits are not received and separated by nine bits (i.e. the eight data bits $D_0$–$D_7$ and the parity bit 64), a framing error is said to have occurred. Similarly, referring also to FIG. 2B, in the DF1 protocol, eight data bits $D_0$–$D_7$ are said to be framed between the start bit 68 and the stop bit 70. When operating in the DF1 protocol, when the start bit 68 and stop bit 70 are separated by any number of bits other than eight, a framing error is said to have occurred.

Referring again to FIGS. 1, 2A and 2B, both the controller 10 and the computer 42 can be configured to communicate in either the DF1 protocol or the DH-485 protocol. The HHP 52, like the computer 42 can communicate in the DF1 protocol. However, the HHP 52 is incapable of communicating in the DH-485 protocol.

The physical construction of the interface module is explained in detail in U.S. Pat. No. 5,485,690 which is assigned to the same assignee as the present invention and is incorporated herein by reference. Therefore, the physical construction of the interface module will not be explained again here in detail. However, interface module 15 components that are required to implement the inventive method will be explained in reference to FIG. 3.

Referring now to FIG. 3, interface module components that are important for the purposes of the present invention include a port driver 29, a UART 32, a correct signal detector 34, a counter 36, a configuration module 38, and a portion of read only memory 40.

The port driver 29 simply receives data from the interface port and provides bit data to the interface port 19 in serial format. The UART 32 receives serial data from the port driver 29 and provides serial data to the port driver via line 27 and provides parallel data and receives parallel data from other portions of the controller on data bus 33. The UART 32 may be any of several commercially available integrated circuits. The UART 32 converts the parallel data which is presented on bus 33 into a properly formatted serial signal which is fed to line 27. Similarly, the UART 32 converts serial signals on line 27 into parallel data which is properly formatted for transmission on bus 33. The UART 32 can be configured so that it can receive and transmit data according to various communication protocols. In the present case, the UART 32 can be configured to communicate in either the DF1 or the DH-485 protocols illustrated in FIGS. 2A and 2B.

In addition to converting parallel data to serial signals and vice versa, the UART 32 also provides status signals indicating the current state of UART data. Two status signals that the UART 32 generates are a Receive Data Register Full (RDRF) signal and a Framing Error (FE) signal. The RDRF signal indicates when all of the data registers in the UART 32 are filled with data bits. For example, referring again to FIG. 2B, when the UART 32 is configured to communicate in the DF1 protocol and ten bits of data (i.e. one start bit 68, eight data bits $D_0$–$D_7$ and one stop bit 70) are received, the RDRF signal would be generated indicating that all UART registers are full of data. Similarly, referring also to FIG. 2A, if the UART 32 is configured in the DF1 protocol and a DH-485 message is received, because the DH-485 message includes at least ten data bits (i.e. eleven bits), the UART registers would be full and the RDRF signal would be generated.

On the other hand, when the UART 32 is configured in the DH-485 protocol and includes eleven data registers (i.e. one start bit 62, eight data bits $D_0$–$D_7$, a parity bit 64 and one stop bit 66), the RDRF signal would only go high when a DH-485 protocol message is received. This is because a DF1 message would only include ten bits and could not fill all eleven UART data registers.

The FE signal indicates when the UART has received a bit pattern that is framed incorrectly (i.e. the data received does not include proper start and stop bits in sequence which matches the UART's currently configured protocol). For example, if the UART 32 is currently configured to communicate in the DF1 protocol and messages are provided to the UART 32 in the DH-485 protocol, the UART 32 recognizes that the RDRF signal has been provided but that the one stop bit 66 has not been detected (i.e. because the UART 32 is configured with only ten data registers and the DH-485 stop bit 66 is the eleven bit in the DH-485 message, the stop bit is cut off). In response, the UART 32 generates an FE signal indicating a framing error.

Similarly, if the UART 32 is currently configured to communicate in the DH-485 protocol and messages are provided to the UART 32 in the DF1 protocol, the UART 32 recognizes that the stop bit 70 has been received and that the RDRF signal has not been provided (i.e. because the UART 32 is configured with eleven data registers and the DF1 message only includes ten bits of data the RDRF signal is not generated). Again, in this case the UART 32 generates an FE signal. The RDRF signal is supplied on line 37 while the FE signal is supplied on line 35.

Referring again to FIGS. 1, 2A and 2B, when data is transmitted from a computer 42 or HHP 52 to the controller 10, often electrical and magnetic noise can distort signals so that, while a DF1 or DH-485 protocol message is transmitted, a framing error may occur. In addition, each protocol can be transmitted at different baud rates and data transmitted at the configured protocol, but at the wrong baud rate can also produce framing errors. When a framing error is related to noise or an incorrect baud rate, UART protocol should not be altered.

Referring also to FIG. 3, to reduce the possibility of an erroneous UART reconfiguration due to noise or incorrect baud rate, the counter 36 and correct signal detector 34 together track consecutive framing errors and effect a UART reconfiguration only when a consecutive error limit has been reached. In addition, the HHP 52 and computer 42 are programmed to consecutively cycle through all possible protocol baud rates during transmission until the baud rate which the controller is operating is identified and the consecutive error limit is selected to be greater than the number of possible baud rates so that transmission at each possible baud rate is attempted prior to changing protocols. In other words, the consecutive error limit is selected to be high enough to prohibit protocol switching from the DF1 to the DH-485 protocol until all valid DF1 baud rates have been attempted once. Similarly, the consecutive error limit is selected to be high enough to prohibit a protocol switch from the DH-485 to the DF1 protocol until all valid DH-485 baud rates have been attempted at least once. In this way, a few noise or baud rate related framing errors will not result in erroneous UART reconfiguration.

The counter 36 receives the FE signals on line 35 and counts consecutive framing errors. To eliminate the effects of erroneous noise and incorrect baud rates, each time the UART receives a message that is correctly framed (i.e. is in the UART's currently configured protocol and is undistorted by noise or baud rate), the correct signal detector 34 resets the counter's consecutive error count to zero and the consecutive error count it restarted. When a RDRF signal is produced indicating that all UART registers have been filled with data and no FE signal has been produced, the message received by the UART 32 is in a format that conforms to the UART's currently configured protocol. Thus, to identify correct signals, detector 34 receives both the FE and RDRF signals and generates a reset signal on line 45 only when an RDRF signal has been received an no FE signal has been received. The reset signal is provided to a reset on the counter 36 via line 45. The counter 36 provides a protocol error signal on line 39 when the consecutive error limit has been reached.

The read only memory 40 includes information required to configure the UART 32 in both the DF1 protocol and DH-485 protocol. The ROM 40 includes a DF1 protocol section 67 and a DH-485 protocol section 69 that store DF1 and DH-485 communication parameters. Among other things, these parameters include baud rate, word size, and control bits for the serial data signal format.

The configuration module 38 receives signals from the counter 36 via line 39 and can retrieve protocol configuration information from the ROM 40 via bus 41 for the purpose of reconfiguring the UART 32 as required. When the UART has to be reconfigured, the configuration module 38, using the reconfiguration information from the ROM 40, reconfigures the UART 32 via bus 43.

Figure 4:
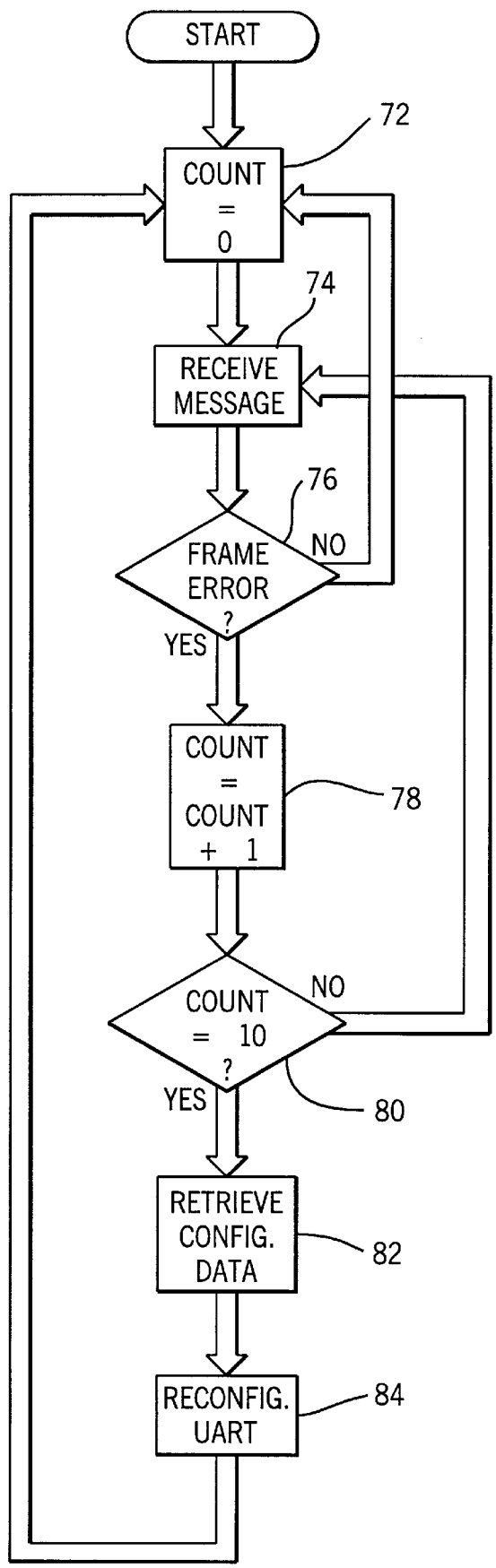
FIG. 4 is a flow chart depicting the inventive method.

Referring now to FIGS. 1, 3 and 4, assuming that the controller 10 and UART 32 are initially configured to communicate via port 19 in the DH-485 protocol, and a user connects an HHP 52 to port 19 to communicate with the controller 10, beginning at process block 72, the counter 36 sets the consecutive error count to zero. When connected, the HHP 52 begins to send messages via cable 58 and connector 60 to the port 19. The port driver 29 receives HHP serial signals at process block 74 and provides the messages in serial data format on line 27 to the UART 32. The UART 32 determines whether or not a framing error has occurred at decision block 76. Where no framing error has occurred, the UART 32 converts the serial HHP signals into parallel data and transmits the data on bus 33. In addition, where no error takes place, the detector 34 also receives an RDRF signal on line 37 indicating that all UART 32 registers have been filled and does not receive an FE signal (i.e. no framing error took place). In response, the detector resets the consecutive error count to zero via a reset signal on line 45 and control is returned to block 72 (FIG. 4).

However, where the UART 32 detects a framing error at process block 76, the UART 32 generates a framing error signal on line 35 which is provided to the counter 36 and the detector 34. At process block 78 the counter 36 increases the consecutive error count by one. The counter 36 determines whether or not the consecutive error count has reached the consecutive error limit at decision block 80. In the preferred embodiment, the consecutive error limit is 10. It has been found through experimentation that a count of 10 reduces the possibility of error due to noise to a negligible level.

When the error count reaches the consecutive error limit at decision block 80, the counter 36 produces a protocol error signal on line 39 which is provide to the configuration module 38.

At this point, the configuration module 38 retrieves the DF1 protocol configuration information 67 from the ROM 40. The configuration module 38 then uses the DF1 protocol configuration information 67 to reconfigure the UART 32 at process block 84 so that the UART 32 can communicate in the DF1 protocol. Next, control is returned back to process block 72 where the count is reset to zero and the process described above is repeated.

Referring again to decision block 80, where the consecutive error has not reached the consecutive error limit, control is returned back to process block 74 where the next message from the HHP is received. When the next message is received, the UART 32 again checks for a framing error at decision block 76. When all UART registers have been filled, the UART generates an RDRF signal. When a framing error has not occurred and the consecutive error count has not reached the consecutive error limit at decision block 80, when the detector 34 receives the RDRF signal, it generates a reset signal on line 45 to reset the counter 36 count to zero at process block 72. Thus, despite earlier indications of an incorrect protocol, because a message is received which is in the UARTs current configured protocol prior to the consecutive error count reaching the consecutive error limit, it is presumed that the earlier incorrect protocol indication was due to inadvertent noise and the consecutive error count is reset to zero.

Similarly, when the controller 10 and UART 32 are initially configured to communicate in the DF1 protocol, if a computer 42 is connected to port 19 and begins to communicate in the DH-485 protocol, the UART 32 will produce framing errors on line 35. If the number of consecutive framing errors reaches the consecutive error limit, the counter 36 will again signal the configuration module 38 to retrieve non-current protocol configuration information. This time, the non-current protocol configuration information will be for the DH-485 protocol 69. Then, the configuration module 38 will reconfigure the UART 32 so that it can communicate in the DH-485 protocol as required.

A simple method and apparatus have been described for changing controller interface port protocol when a peripheral device attached to the interface port is using a protocol which is different than the current interface protocol. This new method and apparatus makes controller programming, monitoring and sampling easier and renders HHPs usable with all controllers that can communicate in the DF1 protocol despite the fact that some controllers may initially be configured to communicate in the DH-485 protocol.

It should be understood that the methods and apparatus as described above are only examples and do not limit the scope of the invention and that various modifications could be made by those skilled in the art that fall under the scope of the invention. For example, while the method above is described in the context of the DF1 and DH-485 protocols, clearly, the present invention could be used with any two protocols having different framing start and stop bits configurations. In addition, while the present invention is described in the context of identifying framing errors, clearly, parity error bits or other bits typically provided by a UART could be used to identify protocol differences between a current controller protocol and the protocol used by a peripheral device connected to the interface port. Furthermore, while the method is described in the context of two different protocol&, the method could be used where there are more than two protocols. For example, the method could be used where there are three protocols and could step through the first protocol and the second protocol, where required prior to reaching the third protocol. In addition, while the consecutive error limit in the method and apparatus above is ten, this is only a preferred limit and any limit could be employed which is calculated to take into account noise considerations. Moreover, the invention can be used with computers 42 that do not automatically change baud rates to check all possible baud rates. In this case, a user would have to alter baud rate when it is apparent that the computer baud rate is incorrect. In the alternative, the controller could be programmed to cycle through different baud rates in a fashion similar to that described above for protocol switching. Thus, when in DF1 at a first baud rate a framing error occurs, the controller baud rate could be changed to a second baud rate in DF1 and so forth.

To apprise the public of the scope of this invention, we make the following claims.

We claim:

1. A method to be used with a programmable controller that is capable of communicating with peripheral devices according to at least first and second protocols, the protocol currently used by the controller being a current protocol and the other of the first and second protocols being a non-current protocol, the method for automatically switching controller communication from the current protocol to the non-current protocol when a peripheral device communicates in the non-current protocol, the method comprising the steps of:

(a) with the controller communicating in the first protocol so that the first protocol is the current protocol, receiving messages;
    (b) determining if received messages are in the first protocol;
    (c) when received messages are not in the first protocol, switching controller communication so that the second protocol is the current protocol and the first protocol is the non-current protocol; and
    (d) repeating steps (a) through (c) with the current protocol as the first protocol and the non-current protocol as the second protocol.

2. The method of claim 1 wherein the controller includes a counter and the step of determining if received messages are in the first protocol includes the steps of, with a counter count initially set at zero, incrementing the counter count by one each time a received message is not in the first protocol and, after a consecutive error limit has been reached, indicating that the messages are not in the first protocol.

3. The method of claim 2 wherein the count is reset to zero each time the received message is in the first protocol.

4. The method of claim 2 wherein the limit is 10.

5. The method of claim 1 wherein each protocol includes data in a specific format including a specific number of start and stop bits that form a protocol frame and the step of determining if the messages received are in the first protocol includes the step of determining if there is a framing error.

6. The method of claim 1 wherein the first protocol includes a parity check bit and the second protocol does not include a parity check bit and the step of determining if the messages received are in the first protocol includes the step of checking for the parity bit.

7. The method of claim 1 wherein the first and second protocols are at different baud rates.

8. An apparatus to be used with a programmable controller that is capable of communicating with peripheral devices according to at least first and second protocols, the protocol currently used by the controller being a current protocol and the other of the two protocols being a non-current protocol, the apparatus for automatically switching controller communication from the current protocol to the non-current protocol when a peripheral device communicates in the non-current protocol, the apparatus comprising:

with the controller communicating in the first protocol so that the first protocol is the current protocol, a receiver for receiving messages;
    a determiner for determining if the messages received are in the first protocol; and,
    a configuration module for:
        when messages received are not in the first protocol, switching controller communication so that the second protocol is the current protocol and the first protocol is the non-current protocol.

9. The apparatus of claim 8 wherein the controller includes a counter and the determiner determines if the received messages are in the first protocol by, with a counter count initially set at zero, incrementing the counter count by one each time a received message is not in the first protocol and, after a consecutive error limit has been reached, indicating that the messages are not in the first protocol.

10. The apparatus of claim 9 wherein the count is reset to zero each time the received message is in the first protocol.

11. The apparatus of claim 9 wherein the limit is 10.

12. The apparatus of claim 8 wherein each protocol includes data in a specific format including a specific number of start and stop bits that form a protocol frame and the determiner determines if the messages received are in the first protocol by determining if there is a framing error.

13. The apparatus of claim 8 wherein the first protocol includes a parity check bit and the second protocol does not include a parity check bit and the determiner determines if the messages received are in the first protocol by checking for the parity check bit.

14. The method of claim 1 wherein the first protocol can be at least first and second baud rates and the second protocol can be at least two different baud rates, the baud rate currently used by the controller being a current baud rate and the other of the first and second baud rates being a non-current baud rate, with the controller communicating at the first baud rate so that the first baud rate is the current baud rate, the step of determining if the received messages are in the first protocol including determining if received messages are in the first protocol at the first baud rate and when the received messages are not in the first protocol at the first baud rate, switching controller communication to the first protocol at the second baud rate and determining if received messages are in the first protocol at the second baud rate and the step of switching includes, when received messages are not in the first protocol at the first baud rate and are not in the first protocol at the second baud rate, switching controller communication so that the second protocol is the current protocol and the first protocol is the non-current protocol.

* * * * *